US009141795B2

(12) United States Patent
Satish

(10) Patent No.: US 9,141,795 B2
(45) Date of Patent: Sep. 22, 2015

(54) TECHNIQUES FOR DETECTING MALICIOUS ACTIVITY

(71) Applicant: Symantec Corporation, Mountian View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 63 days.

(21) Appl. No.: 13/886,859

(22) Filed: May 3, 2013

(65) Prior Publication Data

US 2014/0331320 A1   Nov. 6, 2014

(51) Int. Cl.
*G06F 21/56* (2013.01)
*G06F 21/55* (2013.01)
*G06F 21/57* (2013.01)

(52) U.S. Cl.
CPC ............. *G06F 21/56* (2013.01); *G06F 21/554* (2013.01); *G06F 21/577* (2013.01)

(58) Field of Classification Search
CPC ...................................................... G06F 21/56
USPC ............................................................ 726/23
See application file for complete search history.

(56) References Cited

U.S. PATENT DOCUMENTS

| 8,042,186 | B1 | 10/2011 | Polyakov et al. |
| 8,171,554 | B2 | 5/2012 | Elovici et al. |
| 2002/0019849 | A1* | 2/2002 | Tuvey et al. ................ 709/206 |
| 2006/0136890 | A1* | 6/2006 | Jodh ............................. 717/163 |
| 2007/0240215 | A1* | 10/2007 | Flores et al. .................... 726/24 |
| 2009/0049550 | A1 | 2/2009 | Shevchenko |
| 2012/0072983 | A1 | 3/2012 | McCusker et al. |
| 2013/0318568 | A1 | 11/2013 | Mahaffey et al. |

FOREIGN PATENT DOCUMENTS

WO    WO-2010/011897 A2    1/2010

OTHER PUBLICATIONS

International Search Report and Written Opinion issued by the International Searching Authority for Application No. PCT/US2014/035678 mailed on Sep. 23, 2014 (8 pages).

* cited by examiner

*Primary Examiner* — Jacob Lipman
(74) *Attorney, Agent, or Firm* — Wilmer Cutler Pickering Hale and Dorr LLP

(57) ABSTRACT

Techniques for detecting malicious activity are disclosed. In one particular embodiment, the techniques may be realized as a method for detecting malicious activity including receiving information indicating a first process being executed, the first process including a plurality of first process components, receiving information specific to at least one of the plurality of first process components, determining whether the first process exhibits malicious behavior; and identifying which of the plurality of first process components is responsible for the malicious behavior based on the received information.

20 Claims, 4 Drawing Sheets

TECHNIQUES FOR DETECTING MALICIOUS ACTIVITY

FIELD OF THE DISCLOSURE

The present disclosure relates generally to computer viruses and malware and, more particularly, to techniques for detecting malicious activity.

BACKGROUND OF THE DISCLOSURE

Computer viruses and malware can create serious problems for computing systems including, for example, unauthorized access to private data, degradation of system performance, and hijacking of system resources. Accordingly, detection of such malicious activity has become very important. However, traditional methods of detecting malicious activity are not capable of sufficiently detecting malware or viruses that are non-process threats and appear as extensions of trusted operating system processes or applications.

In view of the foregoing, it may be understood that there may be significant problems and shortcomings associated with traditional malicious activity detection.

SUMMARY OF THE DISCLOSURE

Techniques for detecting malicious activity are disclosed. In one particular embodiment, the techniques may be realized as a method for detecting malicious activity comprising receiving information indicating a first process being executed, the first process including a plurality of first process components; receiving information specific to at least one of the plurality of first process components; determining whether the first process exhibits malicious behavior; and identifying which of the plurality of first process components is responsible for the malicious behavior based on the received information.

In accordance with other aspects of this particular embodiment, the first process is an operating system process.

In accordance with other aspects of this particular embodiment, the plurality of first process components are dynamic-link libraries.

In accordance with other aspects of this particular embodiment, the information specific to at least one of the plurality of first process components is received from a first client executing the first process.

In accordance with other aspects of this particular embodiment, the at least one of the plurality of first process components is determined to not be trusted.

In accordance with additional aspects of this particular embodiment, determining whether the first process exhibits malicious behavior includes monitoring network activity.

In accordance with further aspects of this particular embodiment, determining whether the first process that exhibits the malicious behavior is trusted, wherein identifying which of the plurality of first process components is responsible for the malicious behavior is based on the determination of whether the first process that exhibits the malicious behavior is trusted.

In accordance with further aspects of this particular embodiment, anonymizing the information indicating the first process being executed.

In accordance with additional aspects of this particular embodiment, anonymizing the information indicating the first process being executed includes removing client user specific data.

In accordance with additional aspects of this particular embodiment, anonymizing the information indicating the first process being executed includes performing a hash operation.

In accordance with other aspects of this particular embodiment, anonymizing the information indicating the first process being executed includes performing a hash operation for the first process and a hash operation on the process component to generate a hash pair.

In accordance with further aspects of this particular embodiment, receiving information indicating a plurality of processes being executed on a plurality of clients, each of the plurality of processes including a plurality of process components; determining whether the plurality of processes exhibit malicious behavior; and identifying which of the plurality of process components for the plurality of processes are associated with the malicious behavior.

In accordance with additional aspects of this particular embodiment, the first process is executed at a first client.

In accordance with further aspects of this particular embodiment, receiving information indicating a second process being executed at a second client different from the first client, the second process including second process components; receiving information specific to at least one of the second process components that has been determined to be not trusted; determining whether the second process exhibits malicious behavior; determining whether one of the second process components is the same as one of the first process components when the first and second processes exhibit malicious behavior; and identifying the second process component that is the same as the first process component as malicious.

In accordance with further aspects of this particular embodiment, determining whether the first process and the second process are operating system processes, wherein identifying the second process component as malicious is based on the determination of whether the first and second processes are the operating system processes.

In accordance with further aspects of this particular embodiment, containing the first process component identified as being responsible for the malicious behavior.

In accordance with additional aspects of this particular embodiment, containing the first process component includes blocking the first process component.

In accordance with other aspects of this particular embodiment, the first process component is blocked from being loaded into a process address space.

In another particular embodiment, the techniques may be realized as least one non-transitory processor readable storage medium storing a computer program of instructions configured to be readable by at least one processor for instructing the at least one processor to execute a computer process for performing the method for detecting malicious activity comprising receiving information indicating a first process being executed, the first process including a plurality of first process components; receiving information specific to at least one of the plurality of first process components; determining whether the first process exhibits malicious behavior; and identifying which of the plurality of first process components is responsible for the malicious behavior based on the received information.

In another particular embodiment, the techniques may be realized as a system for detecting malicious activity comprising: one or more processors communicatively coupled to a network; wherein the one or more processors are configured to: receive information indicating a first process being executed, the first process including a plurality of first process components; receive information specific to at least one of the plurality of first process components; determine whether the first process exhibits malicious behavior; and identify which of the plurality of first process components is responsible for the malicious behavior based on the received information.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
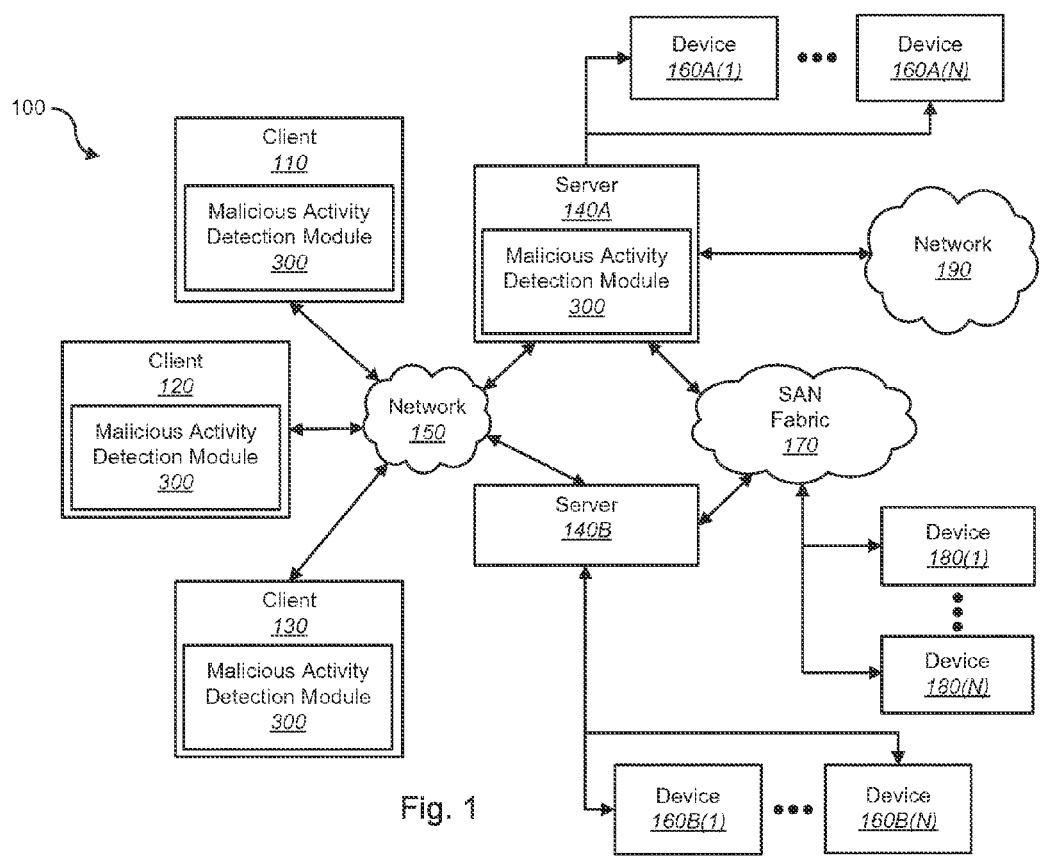
FIG. 1 shows a block diagram depicting a network architecture in accordance with an embodiment of the present disclosure.

FIG. 1 shows a block diagram depicting a network architecture for detecting malicious activity in accordance with an embodiment of the present disclosure.

FIG. 1 is a simplified view of network architecture 100, which may include additional elements that are not depicted. Network architecture 100 may contain client systems 110, 120 and 130, as well as servers 140A and 140B (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Client systems 110, 120 and 130 may contain a malicious activity detection module (e.g., malicious activity detection module 300). In addition, servers 140A and 140B may contain a malicious activity detection module (e.g., malicious activity detection module 300). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
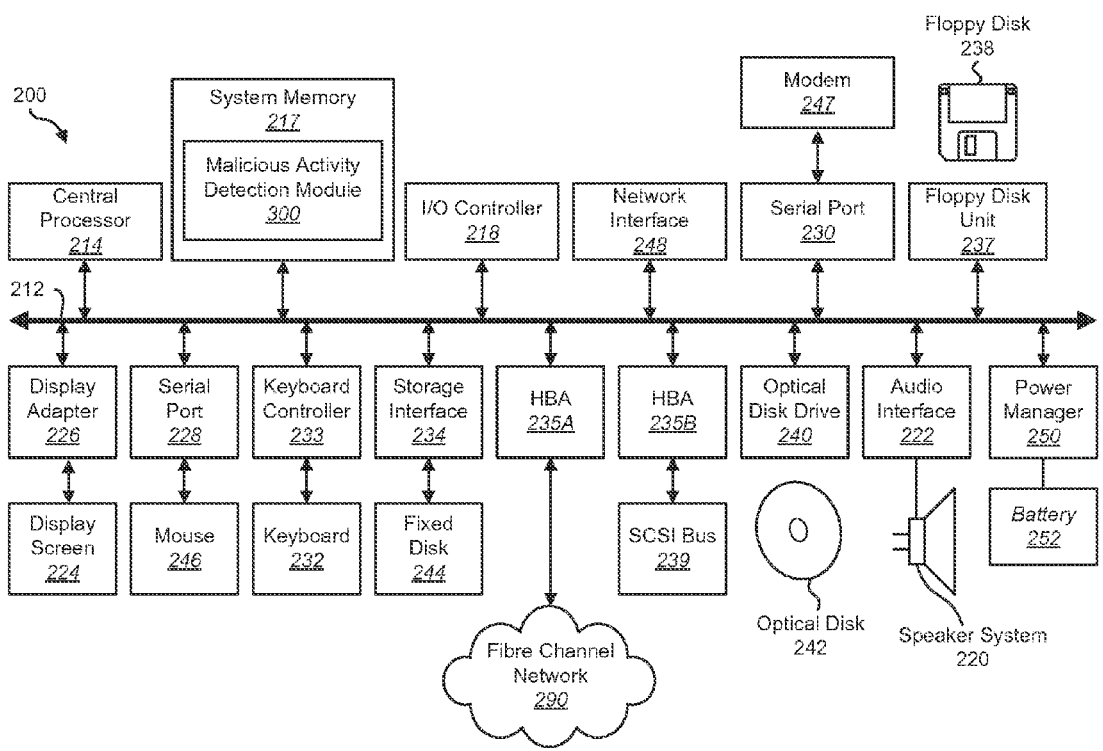
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on servers 140A and 140B using, for example, a web browser or other client software (not shown). Such a client may allow client systems 110, 120 and 130 to access data hosted by any one of servers 140A and 140B or one of storage devices 160A(1)-(N), 160B(1)-(N), and/or 180(1)-(N). In some embodiments, client systems 110, 120 and 130 may have a security agent implemented thereon to protect the client systems from computer viruses and/or malware, and be in communication with a backend security system implemented on server 140A.

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to any one of servers 140A and 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. For example, storage devices 160B(1)-(N) and/or 180(1)-(N) may be used to store data replicated from storage devices 160A(1)-(N).

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, anti-malware/virus security servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage.

According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors. Further, the one or more portions of data that have been backed up or archived may be recovered upon occurrence of a particular event according to a failover policy. According to other embodiments, servers 140A and 140B may identify malicious malware and computer viruses based on collected information from any source including clients 110 120, and 130. As a result, servers 140A and 140B may distribute information to clients 110, 120, and 130 to prevent malware and viruses from infecting the clients 110, 120, and 130.

According to some embodiments, clients 110, 120, and 130 may contain one or more portions of software for detection of malicious activity such as, for example, malicious activity detection module 300. In addition, server 140A may contain one or more portions of software for detection of malicious activity such as, for example, malicious activity detection module 300. As illustrated, one or more portions of the malicious activity detection module 300 may reside at a network centric location. According to some embodiments, network 190 may be an external network (e.g., the Internet) and server 140A may be a gateway or firewall between one or more internal components and clients and the external network. According to some embodiments, the malicious activity detection module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, the malicious activity detection module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
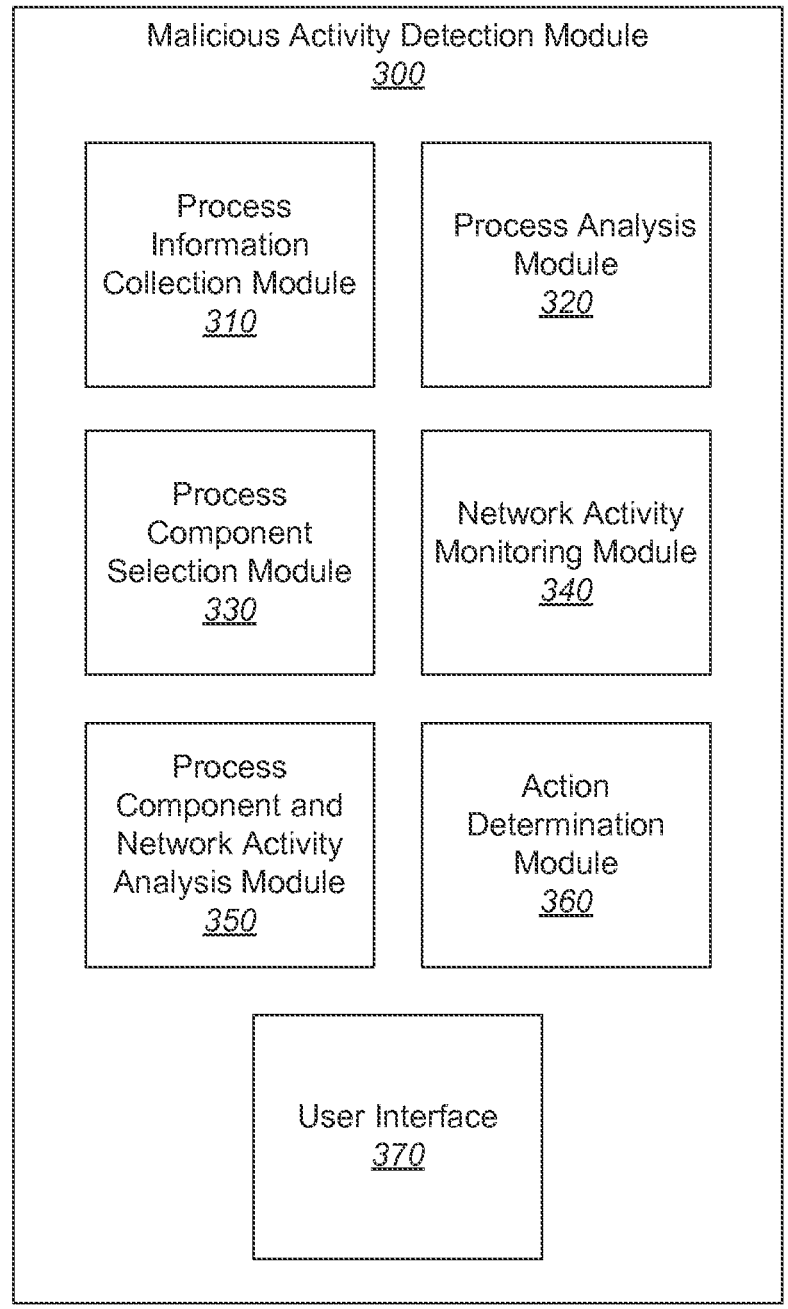
FIG. 3 shows a malicious activity detection module in accordance with an embodiment of the present disclosure.

FIG. 3 shows a malicious activity detection module 300 in accordance with an embodiment of the present disclosure. As illustrated, the malicious activity detection module 300 may contain one or more components including a process information collection module 310, a process analysis module 320, a process component selection module 330, a network activity monitoring module 340, a process component and network activity analysis module 350, an action determination module 360, and a user interface 370.

The process information collection module 310 may collect information on processes being executed. In some embodiments, the processes being executed may be associated with an operating system such as MS-WINDOWS® or any other program. For example, the processes being executed may include winlogon.exe, lsass.exe, and svchost.exe as part of the operating system. In addition, the process information collection module 310 may collect information on processes components/modules associated with the processes being executed. In at least one embodiment, the processes components/modules may be dynamic-link library files or DLL files.

In at least one example, the process information collection module 310 may be implemented on client 110 and collect information about process and process components executed at the client 110. Additionally, the process information collection module 310 may remove any user information associated with the processes and process components/modules executed at client 100. For example, the process information collection module 310 may create a hash of a process and a hash of a process component/module to create a hash pair. As a result, the hash pair may contain information about the process and process component but has been anonymized to remove user specific information or any other particular information.

The process analysis module 320 may analyze the process components identified by the process information collection module 310 to determine whether the processes and the process components are trusted or untrusted. In some embodiments, the process analysis module 320 may determine whether the processes and the process components are trusted based on a preset list. In at least one example, the process analysis module 320 may be implemented at the client 110 to determine whether the processes and the process components loaded into the processes executed on the client 110 are trusted.

The process component selection module 330 may select the process components that were not determined by the process analysis module 320 to be trusted. For example, the process analysis module 320 may determine that ten out of 100 process components loaded into process "A" are not trusted and the process component selection module 330 may select those ten untrusted process components for further analysis. Accordingly, the process component selection module 330 may select the hash pairs for the ten untrusted process components for further analysis. In some embodiments, the process component selection module 330 may transmit these hash pairs to a separate location for the further analysis. In at least one example, the process component selection module 330 may be implemented on client 110 and transmit the hash pairs for the untrusted process components to server 140A functioning as a backend security system for further analysis.

The network activity monitoring module 340 may monitor and collect network and system activity to detect malicious behavior. The network activity monitoring module 340 may detect malicious behavior based on a number of different methods including monitoring network traffic. In addition, the network activity monitoring module 340 may monitor for writing to the operating system and termination of security application to detect malicious activity. In some embodiments, the network activity monitoring module 340 may be a network based intrusion prevention system. In at least one example, the network activity monitoring module 340 may be implemented on client 110 to detect malicious network activity at the client 110. In another example, the network activity monitoring module 340 may be implemented on server 140A to detect malicious network activity across the entire network.

The process component and network activity analysis module 350 may examine the hash pairs from the process component selection module 330 and any malicious activity detected by the network activity monitoring module 340 to determine whether a process component is associated with malicious activity. For example, the process component and network activity analysis module 350 may determine whether a process component is a non-process threat ("NPT"). In at least one embodiment, the process component and network activity analysis module 350 may be implemented on a backend security system and receive hash pairs from a plurality of clients. For example, the process component and network activity analysis module 350 may be implemented at server 140A and analyze hash pairs received from each of the clients 110, 120, and 130. Accordingly, if a process is trusted and one or more of the same hash pairs (process and process component) appear across multiple clients that exhibit malicious activity, then the associated process component may be identified or flagged as malicious.

In another embodiment, the process component and network activity analysis module 350 may determine whether an untrusted process component is malicious when the untrusted process component is only loaded into trusted operating system processes. For example, if an untrusted process component (e.g., a DLL) is only loaded into multiple trusted MS-WINDOWS® processes (e.g., winlogon.exe, lsass.exe, svchost.exe, etc.) across multiple clients where the operating system processes do not share any common functionality necessitating the untrusted process component, then the untrusted process component may be identified as malicious.

The action determination module 360 may determine an appropriate action to take with respect to the malicious process component. For example, the action determination module 360 may block a malicious process component from being loaded into a process address space. In other embodiments, the action determination module 360 may generate a new rule based on the malicious process component.

The user interface 370 may provide a user or administrator with control over the malicious activity detection module 300. For example, the user or administrator may specify via the user interface 360 how a newly detected malicious process component should be handled.

Figure 4:
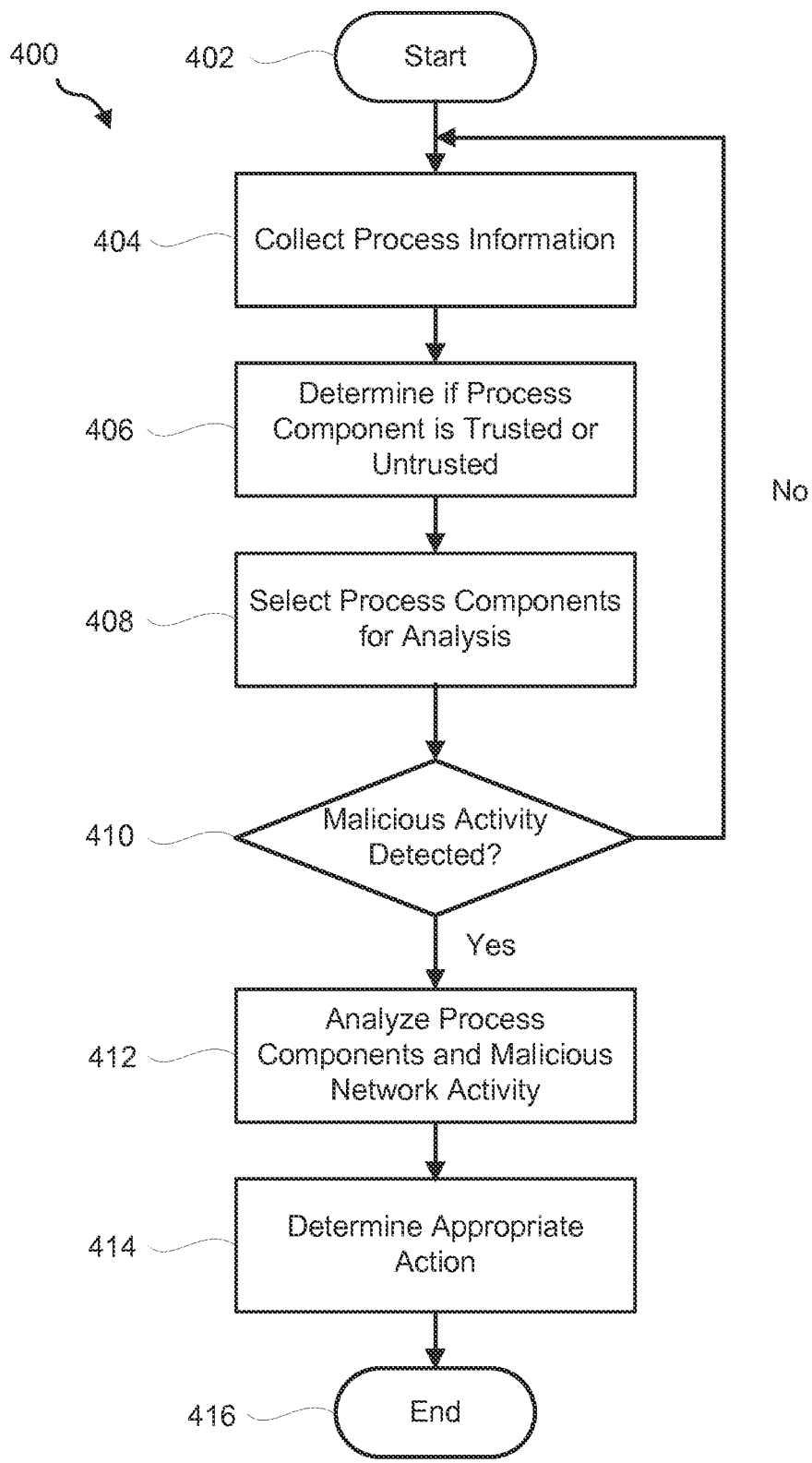
FIG. 4 a method for detecting malicious activity in accordance with an embodiment of the present disclosure.

FIG. 4 shows a method 400 for detecting malicious activity in accordance with an embodiment of the present disclosure. The method 400 may be performed across multiple devices including for example clients 110, 120, 130, and server 140A. In at least one embodiment, blocks 404-410 may be performed at clients 110, 120, and 130, and blocks 412 and 414 may be performed at server 140A. However, any portion of the method 400 described below may be performed on any one of clients 110, 120, 130, and server 140A. At block 402, the method 400 may begin.

At block 404, information for processes being executed may be collected. In some embodiments, the process information may be collected by the process information collection module 310. In addition, information about processes being executed at a plurality of different clients may be collected at this step. In at least one example, processes executing on a first client may be collected at the first client and processes executing on a separate second client may be collected at the second client. The collection of process information at each of the clients may be performed concurrently, sequentially, or at any different time at each client.

The processes may be an operating system process or any program executing on the client. For example, the processes being executed may be associated with an operating system such as MS-WINDOWS® and include winlogon.exe, lsass.exe, and svchost.exe. Additionally, the process being executed may be associated with any other appropriate operating system including those capable of loading external process components into a process address space. Additionally at block 404, information indicating each of the process components or modules loaded into or with the processes being executed may be collected. One example of the processes components/modules is dynamic-link library files or DLL files. However, the process components/modules are not limited to DLL files and may include any number of different formats. Further, a process may have multiple process components loaded (e.g., 1, 5, 10, 25, 50, 100, etc.) and these process components may be different formats.

Further, at block 404, the information collected regarding the processes being executed and the associated process components/modules may be anonymized. In some embodiments, a hash function may be utilized to anonymize the processes and the associated process components. For example, each process may be hashed and each process component may also be hashed to remove any user specific or client specific information. Based on the hashed process and hashed process component, a hash pair indicating the process and process component may be created. This may be performed for each process/process component to generate a plurality of hash pairs. After the process information has been collected, the overall process may then proceed to block 406.

At block 406, each process component identified at block 404 may be analyzed to determine whether or not it is a trusted process component. In some embodiments, each process component may be analyzed by the process analysis module 320. The determination of whether a process component is trusted may be based on a preset list of trusted components such as a white list, a signature within the component itself, or any other appropriate method. In some embodiments, each process component may be analyzed at the respective clients after the information has been collected or may be analyzed at a central backend location (e.g., server 140A). After each of the process components is analyzed to determine whether or not it is trusted, the overall process may then proceed to block 408.

At block 408, the process components that were determined to be not trusted may be selected for further analysis. In some embodiments, the selection of the process components for further analysis may be performed by the process component selection module 330. The process components that are not trusted may or may not be malicious. For example, the untrusted process component may be malware, a nonmalicious process component associated with an enterprise application, or any other nonmalicious component. In some embodiments, the hash pair associated with the process component that was determined to not be trusted may also be selected for further analysis. The trusted process components may be excluded from further analysis since these components are less likely to cause malicious activity. In certain embodiments, the selection of the process components may be performed at the respective clients executing the processes or may be performed at a central backend location (e.g., server 140A). After the process components have been selected, the process may then proceed to block 410.

At block 410, network activity may be monitored for malicious behavior. In some embodiments, the network activity may be monitored by the network activity monitoring module 340. The network activity of the clients executing the processes and the associated process components may be monitored for malicious behavior or activity. In some embodiments, each client may include a security agent which is a network intrusion prevention system capable of detecting any malicious traffic or content on the wire and block it. In at least one example, the malicious activity may be downloading a file to the client which is determined to include a virus or malware by an anti-virus component at a client. Additionally, a security agent at each client may monitor any other activity at the client to determine if it is malicious. For example, the security agent may determine whether there is any unauthorized writing to the operating system, termination of security applications such as anti-virus applications, or any other known malicious activity. When a security event or malicious activity is detected, a process associated with the security event or malicious activity may be determined. Accordingly, the process information including the untrusted process components for the process that exhibited the malicious activity may be submitted for further analysis.

In some embodiments, the activity at each client may be monitor by the client for malicious activity or behavior at the client. For example, each client may monitor its own network activity to determine if a security event has occurred. In other embodiments, activity of a network that includes each client having processes operating thereon may be monitored at a separate location. Monitoring for malicious behavior is not limited to the monitoring of network activity. For example, any other process that are capable of exhibiting malicious behavior such as run time processes may be monitored.

The process of monitoring for malicious activity may occur continuously while any other portion of method 400 is being performed. Additionally, the process of monitoring for malicious activity may occur periodically. If malicious activity has not been detected, the overall process may proceed back to block 404. However, if malicious activity has been detected, the overall process may then proceed to block 412.

At block 412, the detected malicious activity and the collected process information may be analyzed. In some embodiments, the malicious activity and the process information may be analyzed by the process component and network activity analysis module 350. The detected malicious activity and the collected process information may be analyzed at each client or all of the malicious activity and associated process information may be collected at a separate location for analysis. For example, each of a plurality of clients (e.g., clients 110-130) may detect malicious activity at the respective client and transmit associated process information to a separate backend system (e.g., server 140A) for analysis.

In some embodiments, the backend system (e.g., server 140A) may receive detected malicious activity and associated process information from discrete clients. The system may then analyze the malicious activity to determine whether there exist any common security events across multiple clients. If it is determined that a particular security event or malicious activity has occurred across multiple clients, the associated process exhibiting the security event from each client may be determined. Based on the associated process information from each client, the responsible process/process component pairs may be identified. Accordingly, if the same process associated with the malicious activity on the different clients is trusted and a particular process/process component pair appears across several clients, then the particular process component may be assumed malicious.

In additional embodiments, the particular process component potentially associated with the malicious activity may be further analyzed to determine whether the process component is only loaded into selected trusted operating system processes. Accordingly, if it is determined that the potentially malicious process component is only loaded into selected trusted operating system processes that do not share any common functionality and justifies the loading of this process components into the OS processes, then the particular process component (e.g., DLL) may be flagged as malicious. After the detected malicious activity and the collected process information have been analyzed, the overall process may then proceed to block 414.

At block 414, an appropriate action to handle the malicious process component may be determined. In some embodiments, how the malicious process component is handled may be determined by the action determination module 360. In some instances, it may be determined that the malicious process component is to be blocked from being loaded at all times. Additionally, it may be determined that before the malicious process component is allowed to be loaded into a process address space, a security agent at a client must query a separate backend system for approval. In additional embodiments, when a backend system determines that the process component is malicious, a new rule may be generated and distributed to all clients to prevent the malicious process component from being loaded into a process. Further, the appreciate action may be determined in accordance with an input from a user or administrator via the user interface 370. After the appropriate action to handle the malicious process component has been determined, the overall process may then proceed to block 416.

At block 416, the process may end. In some embodiments, the process may proceed back to step 402. Additionally, the process 400 may repeat periodically or continuously.

The above-noted method 400 may be applied to any process implemented on a computing system including operating system processes and non-operating system processes. In some embodiments, the method 400 may be applied to trusted processes that are commonly targeted or to any process. In addition, the method 400 may be applied to any type of non-process threat (e.g., executable or non-executable) that may be loaded into an untrusted process, a trusted process, an operating system process, or any other process.

Further, the method 400 may be applied to non-process threats that are downloaded or created by an untrusted process on the system. In at least one example, if the security agent determines that a process component is malicious (e.g., NPT) and was downloaded, the associated uniform resource locator ("URL") may also be flagged as malicious based on the malicious process component and/or heuristics.

At this point it should be noted that detection of malicious activity in accordance with the present disclosure as described above may involve the processing of input data and the generation of output data to some extent. This input data processing and output data generation may be implemented in hardware or software. For example, specific electronic components may be employed in the detection of malicious activity or similar or related circuitry for implementing the functions associated with detecting malicious activity in accordance with the present disclosure as described above. Alternatively, one or more processors operating in accordance with instructions may implement the functions associated with detecting malicious activity in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for detecting malicious activity comprising:
receiving information indicating a first process being executed, the first process including a plurality of first process components;
receiving information specific to at least one of the plurality of first process components;
determining whether the first process exhibits malicious behavior;
determining whether a second process separate from the first process exhibits malicious behavior, the second process including second process components;
determining whether one of the second process components is the same as one of the first process components when the first and second processes exhibit malicious behavior; and
in the event it is determined that one of the second process components is the same as one of the first process components when the first and second processes exhibit malicious behavior, implementing a predetermined action.

2. The method of claim 1, wherein the first process is an operating system process.

3. The method of claim 1, wherein the plurality of first process components are dynamic-link libraries.

4. The method of claim 1, wherein the information specific to at least one of the plurality of first process components is received from a first client executing the first process.

5. The method of claim 1, wherein the at least one of the plurality of first process components is determined to not be trusted.

6. The method of claim 1, wherein determining whether the first process exhibits malicious behavior includes monitoring network activity.

7. The method of claim 1, further comprising:
determining whether the first process that exhibits the malicious behavior is trusted; and
identifying which of the plurality of first process components is responsible for the malicious behavior based on the determination of whether the first process that exhibits the malicious behavior is trusted.

8. The method of claim 1, further comprising:
anonymizing the information indicating the first process being executed.

9. The method of claim 1, further comprising:
receiving information indicating a plurality of processes being executed on a plurality of clients, each of the plurality of processes including a plurality of process components;
determining whether the plurality of processes exhibit malicious behavior; and
identifying which of the plurality of process components for the plurality of processes are associated with the malicious behavior.

10. At least one non-transitory processor readable storage medium storing a computer program of instructions configured to be readable by at least one processor for instructing the at least one processor to execute a computer process for performing the method as recited in claim 1.

11. The method of claim 8, wherein anonymizing the information indicating the first process being executed includes removing client user specific data.

12. The method of claim 11, wherein anonymizing the information indicating the first process being executed includes performing a hash operation.

13. The method of claim 12, wherein anonymizing the information indicating the first process being executed includes performing a hash operation for the first process and a hash operation on the process component to generate a hash pair.

14. The method of claim 1, wherein the first process is executed at a first client.

15. The method of claim 14, further comprising:
receiving information indicating the second process being executed at a second client different from the first client;
receiving information specific to at least one of the second process components that has been determined to be not trusted; and
identifying the second process component that is the same as the first process component as malicious.

16. The method of claim 15, further comprising:
determining whether the first process and the second process are operating system processes, wherein identifying the second process component as malicious is based on the determination of whether the first and second processes are the operating system processes.

17. The method of claim 1, further comprising:
containing a first process component identified as being responsible for the malicious behavior.

18. The method of claim 17, wherein containing the first process component includes blocking the first process component.

19. The method of claim 18, wherein the first process component is blocked from being loaded into a process address space.

20. A system for detecting malicious activity comprising:
one or more processors communicatively coupled to a network; wherein the one or more processors are configured to:
receive information indicating a first process being executed, the first process including a plurality of first process components;
receive information specific to at least one of the plurality of first process components;
determine whether the first process exhibits malicious behavior;
identify which of the plurality of first process components is responsible for the malicious behavior based on the received information;
determine whether a second process separate from the first process exhibits malicious behavior, the second process including second process components;
determine whether one of the second process components is the same as one of the first process components when the first and second processes exhibit malicious behavior; and
in the event it is determined that one of the second process components is the same as one of the first process components when the first and second processes exhibit malicious behavior, implement a predetermined action.

* * * * *